(12) United States Patent  
Weidner

(10) Patent No.: US 9,719,632 B2  
(45) Date of Patent: Aug. 1, 2017

(54) WINCH MOUNT

(71) Applicant: Jamey Weidner, Cambridge Springs, PA (US)

(72) Inventor: Jamey Weidner, Cambridge Springs, PA (US)

( * ) Notice: Subject to any disclaimer, the term of this patent is extended or adjusted under 35 U.S.C. 154(b) by 472 days.

(21) Appl. No.: 14/474,279

(22) Filed: Sep. 1, 2014

(65) Prior Publication Data

US 2014/0374567 A1    Dec. 25, 2014

Related U.S. Application Data

(63) Continuation-in-part of application No. 13/614,300, filed on Sep. 13, 2012, now Pat. No. 8,820,718.

(51) Int. Cl.
*B66D 1/00* (2006.01)
*F16M 13/02* (2006.01)

(52) U.S. Cl.
CPC .............. *F16M 13/022* (2013.01); *B66D 1/00* (2013.01)

(58) Field of Classification Search
CPC ........ B66D 1/365; B66D 1/485; B66D 3/006; B66D 2700/0183; B66D 2700/0191; F16M 13/022; B60R 2011/0085; B60R 2011/0092
See application file for complete search history.

(56) References Cited

U.S. PATENT DOCUMENTS

| | | | |
|---|---|---|---|
| 1,245,623 A * | 11/1917 | Schmick | B66D 3/16 254/343 |
| 1,264,693 A | 4/1918 | Sieg | |
| 1,402,469 A * | 1/1922 | Baltes | B66D 3/16 254/343 |
| 3,292,873 A * | 12/1966 | Tilloy | B65H 51/08 242/364.2 |
| 3,524,606 A * | 8/1970 | Coski | B65H 75/4402 242/484 |
| 3,788,607 A * | 1/1974 | Crooks | B66D 1/28 254/343 |
| 4,176,827 A | 12/1979 | Anderson et al. | |
| 4,695,010 A | 9/1987 | Smith | |
| 5,593,139 A | 1/1997 | Julian | |
| 5,636,648 A * | 6/1997 | O'Brien | B08B 9/04 134/107 |
| 6,173,705 B1 | 1/2001 | DeWitt | |
| 6,386,514 B1 | 5/2002 | Ray | |
| 6,523,806 B2 | 2/2003 | Bartal | |
| 6,712,338 B2 | 3/2004 | Schafer | |
| 7,080,826 B2 | 7/2006 | Pockl et al. | |
| 7,111,826 B2 | 9/2006 | Cook et al. | |
| 7,300,238 B1 | 11/2007 | James | |
| 7,753,345 B2 | 7/2010 | Arzberger et al. | |
| 7,770,870 B1 | 8/2010 | Fly | |
| 2009/0308993 A1 * | 12/2009 | Chang | F16B 47/00 248/176.3 |

* cited by examiner

*Primary Examiner* — Emmanuel M Marcelo
(74) *Attorney, Agent, or Firm* — Knox Patents; Kenneth C. Spafford

(57) ABSTRACT

A mount for attaching a winch to a vehicle. The mount allows the winch to be rotated to face the cable anchor during use, thereby preventing improper spooling of the cable.

17 Claims, 16 Drawing Sheets

124   126

WINCH MOUNT

CROSS-REFERENCE TO RELATED APPLICATIONS

This application is a continuation-in-part of application Ser. No. 13/614,300, filed Sep. 13, 2012.

FIELD OF THE INVENTION

This disclosure is directed to a device or an assembly that is a winch mount that can be attached to a vehicle, for example an all-terrain vehicle.

BACKGROUND OF THE INVENTION

Vehicles often get stuck in the mud or sand during use and require an external moving force, such as towing or a winch, to become unstuck.

Often a vehicle will have a winch attached to the front or back of the vehicle. When the vehicle becomes stuck, the winch cable is unwound and attached to an anchor, such as a tree or large rock. The winch is then activated to retract the cable, thereby pulling the vehicle toward the anchor and out of the mud, sand, or other entrapping surface.

Ideally, the winch will directly face the anchor so that the winch cable will not spool improperly or bind when the winch is retracting the cable. However, anchor position and availability is a matter of luck, and often the best or only available anchor is not directly facing the winch.

It is therefore an object of the present invention to provide various embodiments of a vehicle winch mount that allows a mounted winch to pivot towards an anchor, or pivot toward another predetermined direction, during use, thereby allowing the cable to spool properly when the cable is retracted.

DETAILED DESCRIPTION OF THE INVENTION

Figure 2:
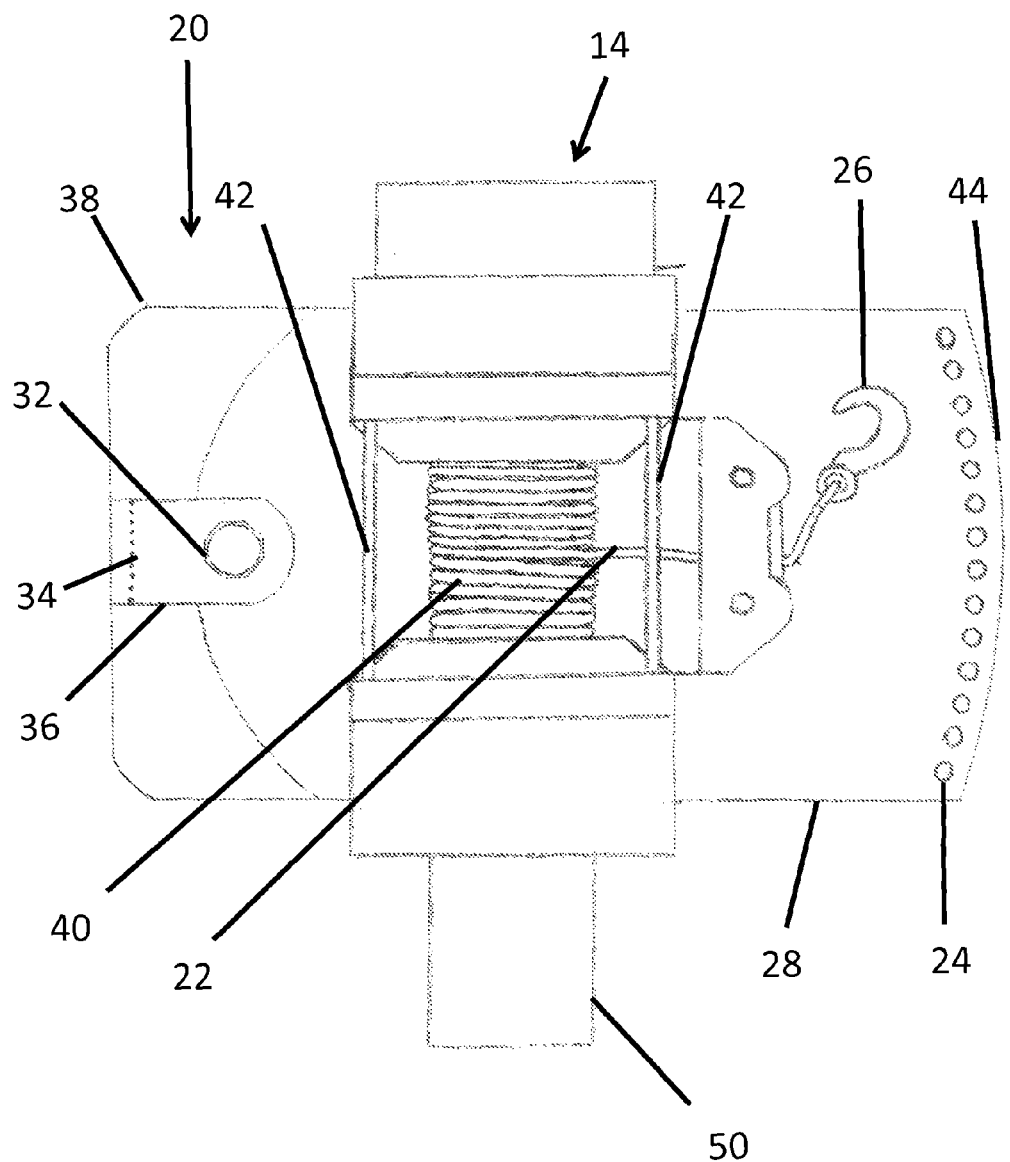
FIG. 2 shows a top view of an embodiment with an attached winch.
Figure 3:
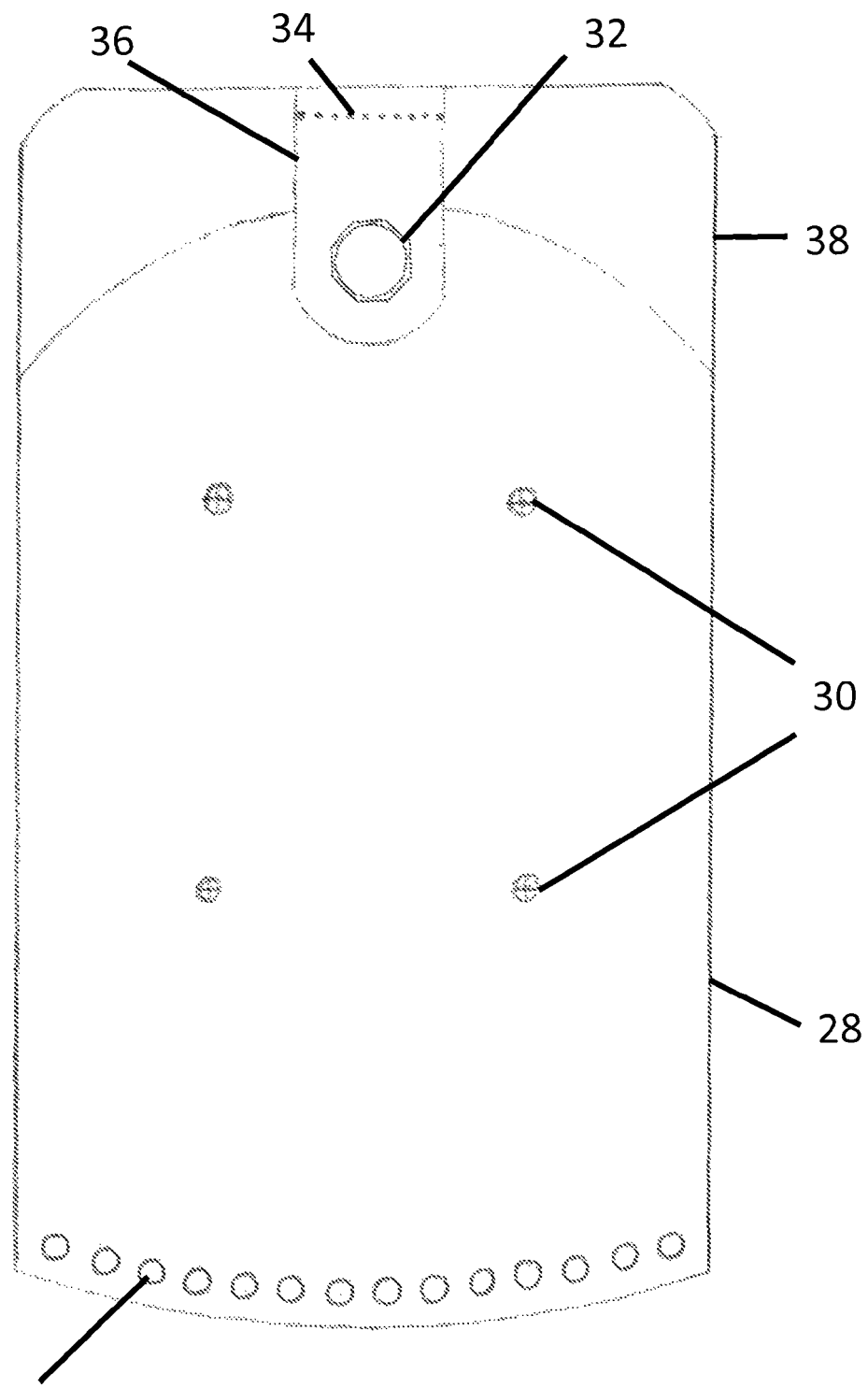
FIG. 3 shows a top view of the embodiment of FIG. 2 without an attached winch.
Figure 4:
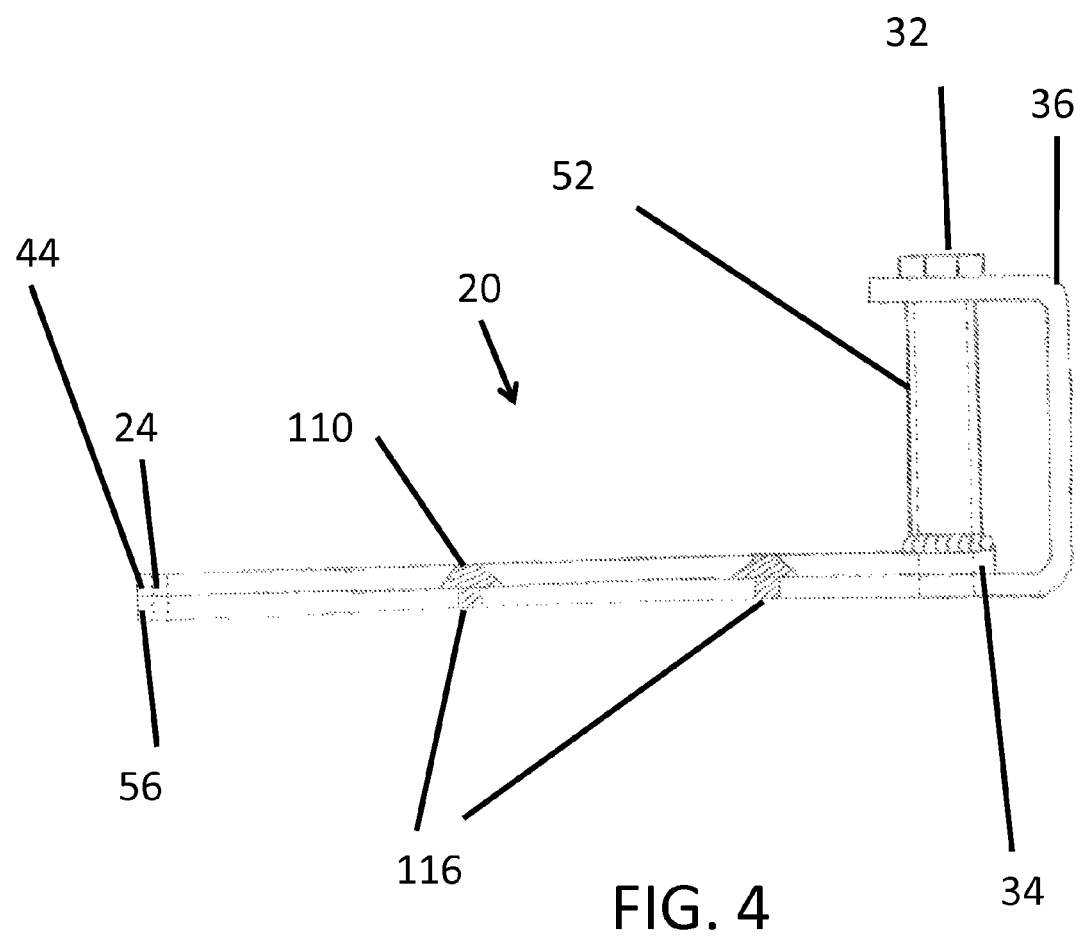
FIG. 4 shows a side view of the embodiment of FIG. 2 without an attached winch.
Figure 5:
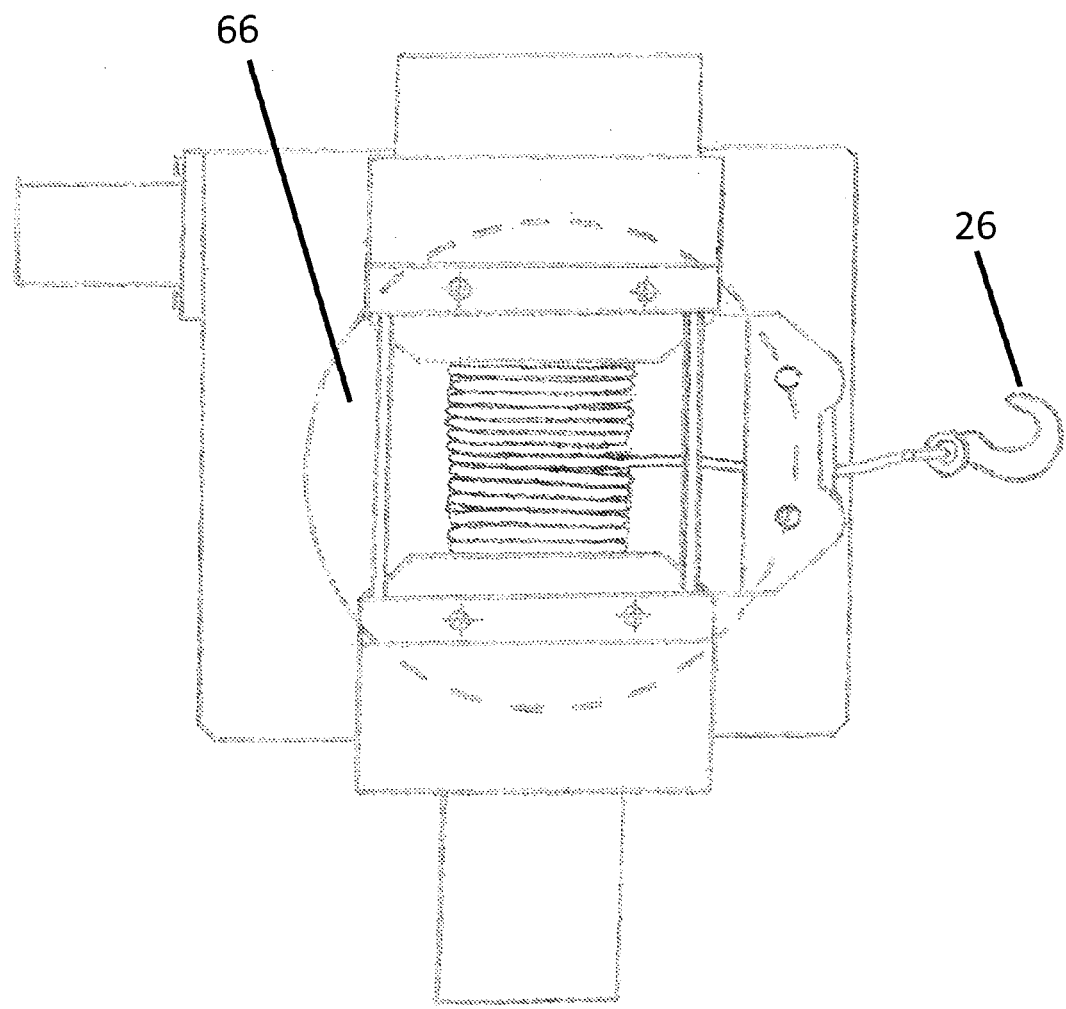
FIG. 5 shows a top view of a second embodiment with an attached winch.
Figure 6:
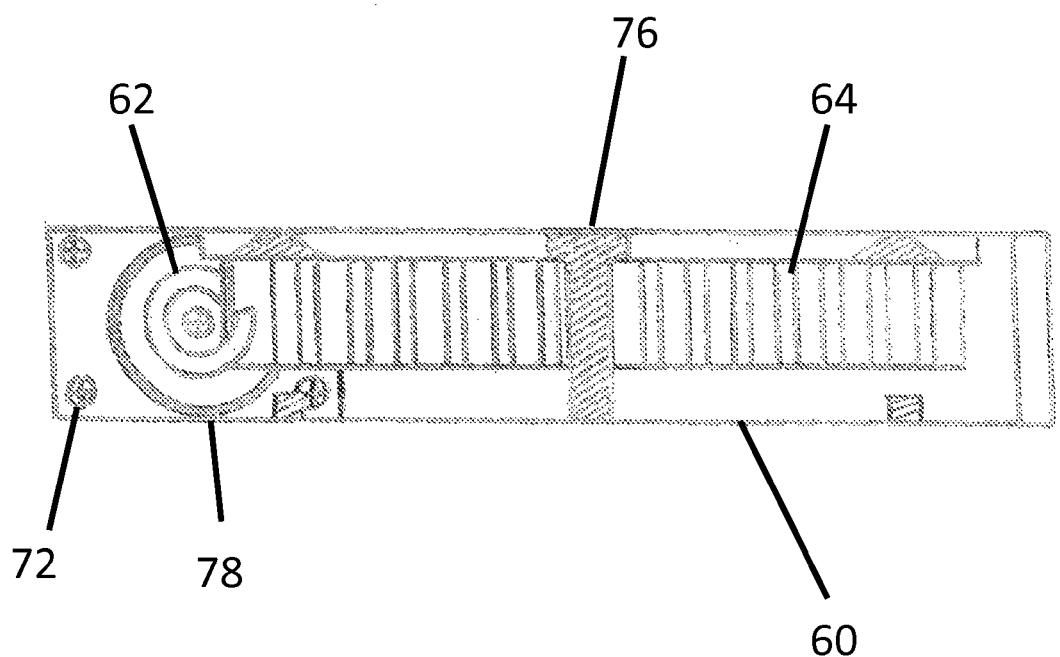
FIG. 6 shows a side view of the embodiment of FIG. 5 without an attached winch.
Figure 7:
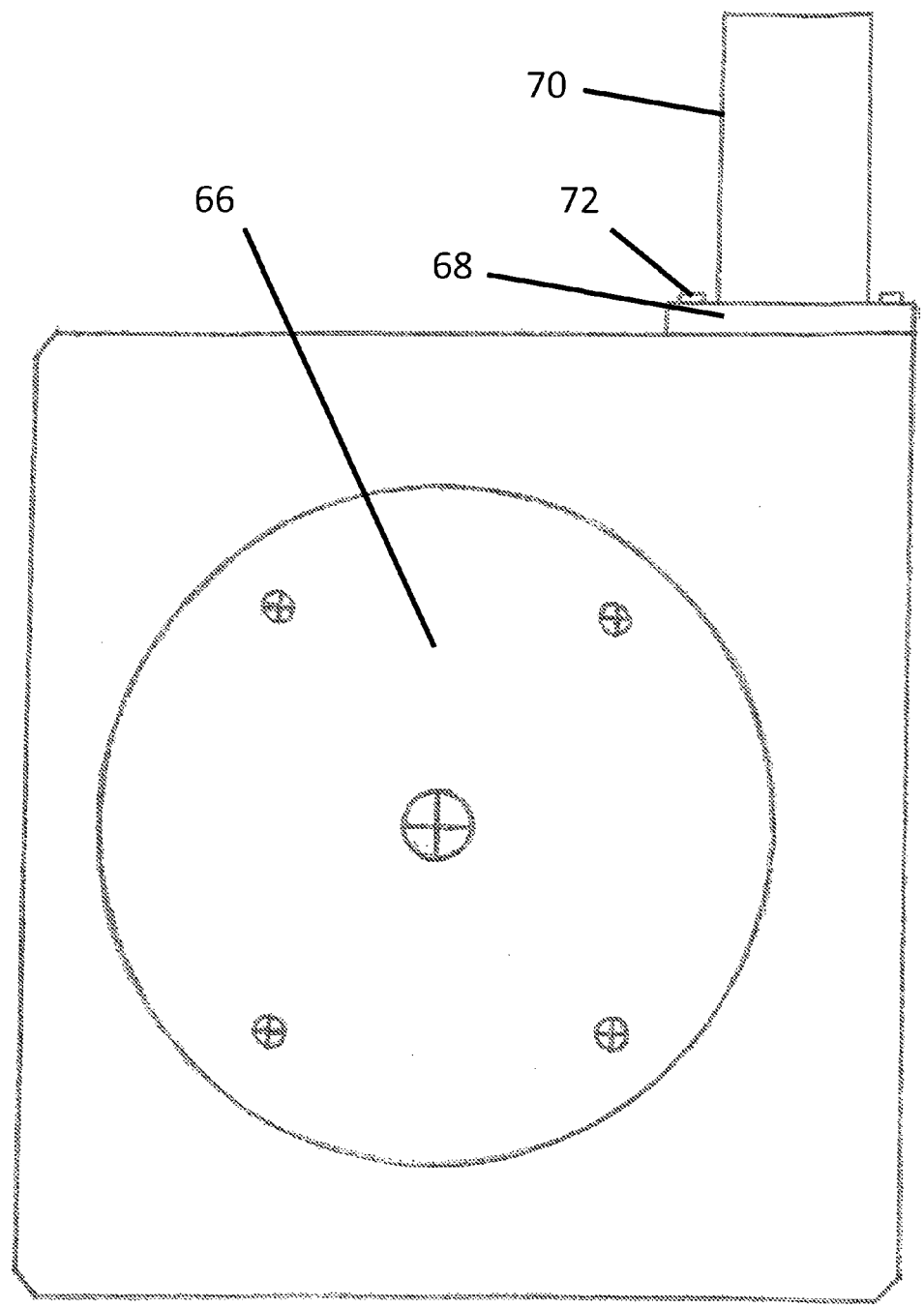
FIG. 7 shows a top view of the embodiment of FIG. 5 without an attached winch.
Figure 8:
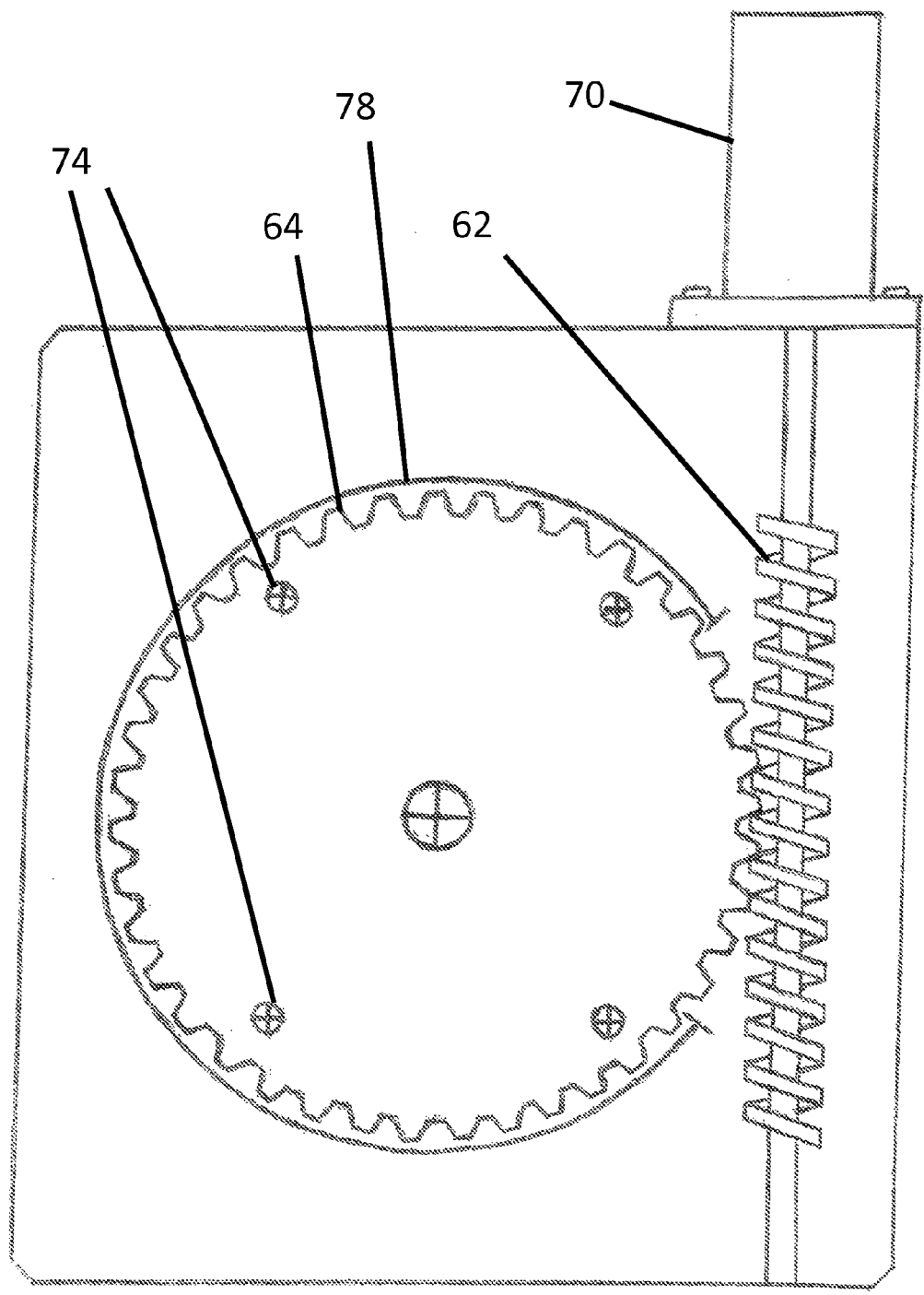
FIG. 8 shows a top cross-section view of the embodiment of FIG. 5 without an attached winch.
Figure 9:
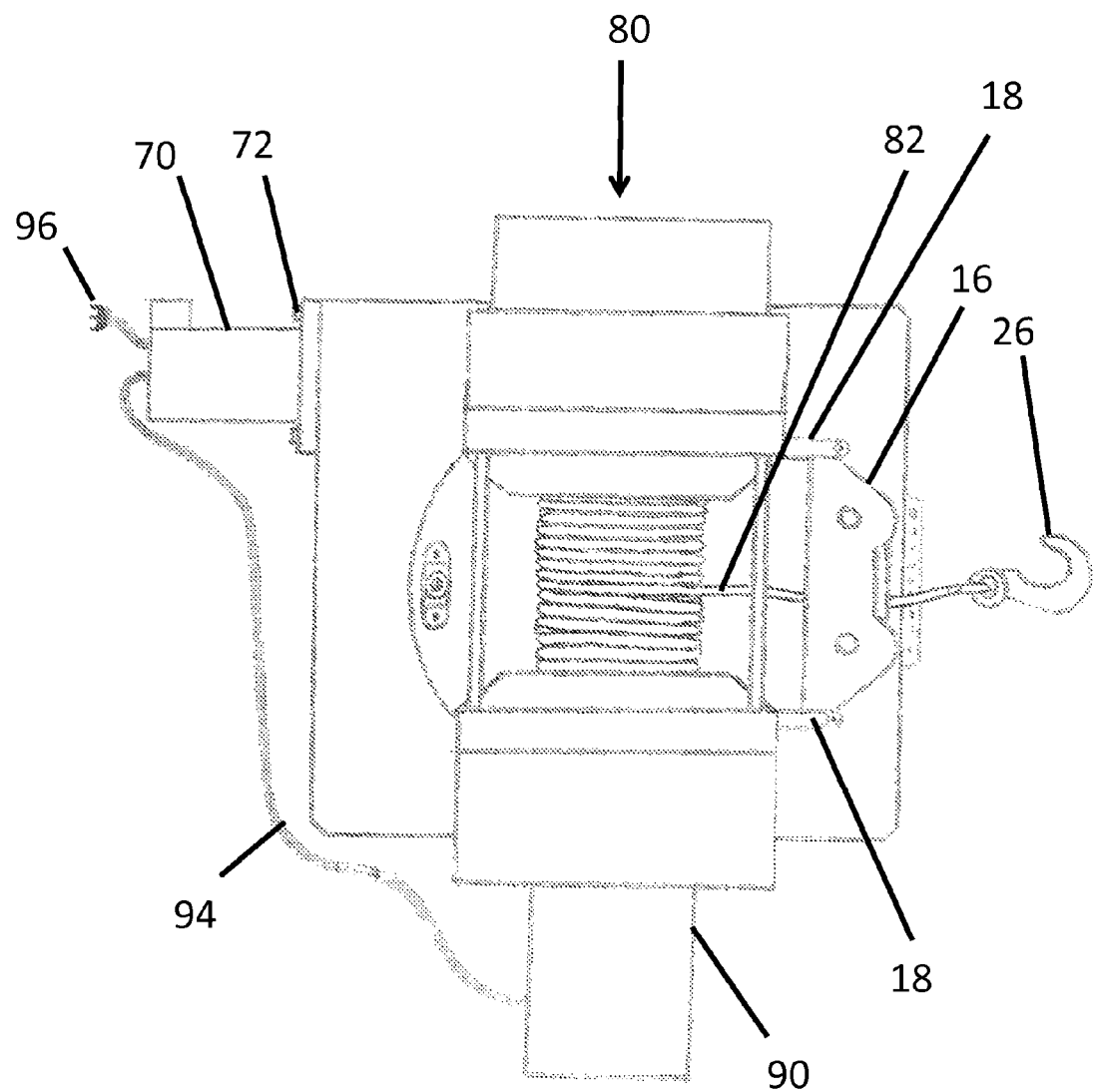
FIG. 9 shows a top view of the embodiment of FIG. 5 with an attached winch and a power connector.

A manual embodiment of the winch mount is shown in FIGS. 2, 3, and 4 generally at 20. Referring to FIG. 2, pivot plate 28 rests flat on base plate 38. Pin holes 24 run directly through base plate 38 and pivot plate 28. Pivot plate front 44 and base plate front 56 are rounded to allow both fronts to remain parallel as pivot plate 28 rotates.

Pivot holding bolt 32 goes through the top of pivot bracket 36, through pivot plate aperture 34, and into the bottom of pivot bracket 36/base plate 38. Pivot holding bolt 32 is covered by pivot tube 52. Pivot bracket 36 may include female threaded apertures where pivot holding bolt 32 intersects with pivot bracket 36 and base plate 38, but pivot plate aperture 34 should not be threaded, in order to allow pivot plate 28 to move freely. Base plate 38 can be affixed to the front or back of an vehicle by, for example, allen bolts placed through topped holes 116.

Winch 14, for example a 12-volt DC winch, can include a cable 22, a hook 26, stabilizer bars 42, a winch drum 40, and a motor casing 50. The underside of winch 14 is affixed to pivot plate 28 at countersunk bolt holes 110 with allen bolts 30. Pivot plate 28 may pivot at pivot holding bolt 32, thereby allowing winch 14 to pivot as well. When winch 14 is facing desired direction, a pin (not shown) may be dropped into one of the pin holes 24 at a point where said holes 24 of the pivot plate 28 and base/mount plate 38 are aligned.

Due to the placement of winch 14 in front of pivot holding bolt 32, the natural tendency of pivot plate 28 is to turn toward the pulling force of the cable 22 such that the winch 14 will naturally face the direction of the anchor 10 when cable 22 is being spooled on the winch drum 40.

Figure 1:
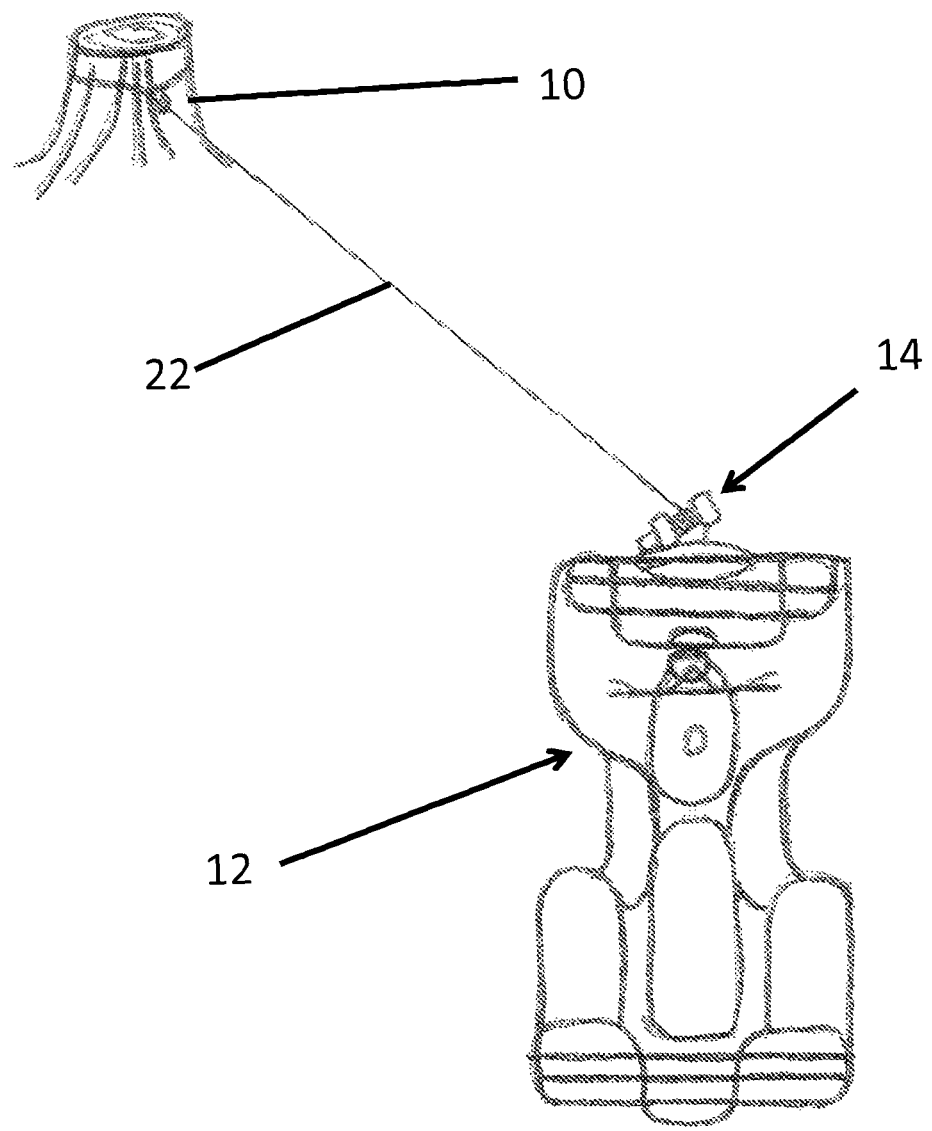
FIG. 1 shows an embodiment of the invention in use.

Thus, as shown in FIG. 1, the winch 14 may directly face an anchor 10, even when the vehicle 12 is not directly facing a useful anchor. Thus, the cable 22 is able to spool properly on the winch drum 40 and not bind during retraction of the cable 22.

A motorized embodiment and its subparts thereof are shown in FIGS. 4-9. In this embodiment, pivot plate 66 and toothed wheel 64 are located in recess 78 in winch mount base 60. Pivot plate 66 is affixed to toothed wheel 64, by, for example, threaded apertures with allen bolts 74. Pivot plate 66 covers toothed wheel 64 completely in order to prevent foreign objects from being lodged in toothed wheel 64. Center pivot bolt 76 is threaded when contacting winch mount base 60 but is not threaded where contacting pivot plate 66 or toothed wheel 64. Worm cylinder 62 is located in hollow cylinder 78 inside winch mount base 60. Worm cylinder 62 interlocks with toothed wheel 64 such that toothed wheel 64 will rotate when worm cylinder 62 spins.

Worm gear motor casing 70 is affixed to winch mount base 60 at flange 68 with fasteners 72, for example, allen bolts. The worm gear motor (not shown), which resides in worm gear motor casing 70, is affixed to worm cylinder 62. Worm gear motor (not shown) can be, for example, a standard 12-volt DC motor and is well known to those with ordinary skill in the art.

Winch 80 is affixed to pivot plate 66 with, for example, allen bolts 74, thereby allowing winch 80 to rotate when worm gear motor is activated. If needed, winch 80 can rotate 360 degrees.

At least two wires inside power/signal cord 94 are electrically coupled to winch drum motor (not shown), for example a 12-volt DC motor, located in winch drum motor casing 90. At least two additional wires in power/signal cord 94 are electrically coupled to worm gear motor (not shown). Power/signal cord coupler 96 is attached to, for example, the battery for the vehicle, as well as to a controller that can send current to the worm gear motor or to the winch drum motor. These types of battery and controller electrical couplings are common for winches installed on vehicles and are well-known and can be easily duplicated by those with ordinary skill in the art. Power/signal cord 94 is long enough to allow winch 80 to rotate without pulling power/signal cord 94 taut.

Figure 13:
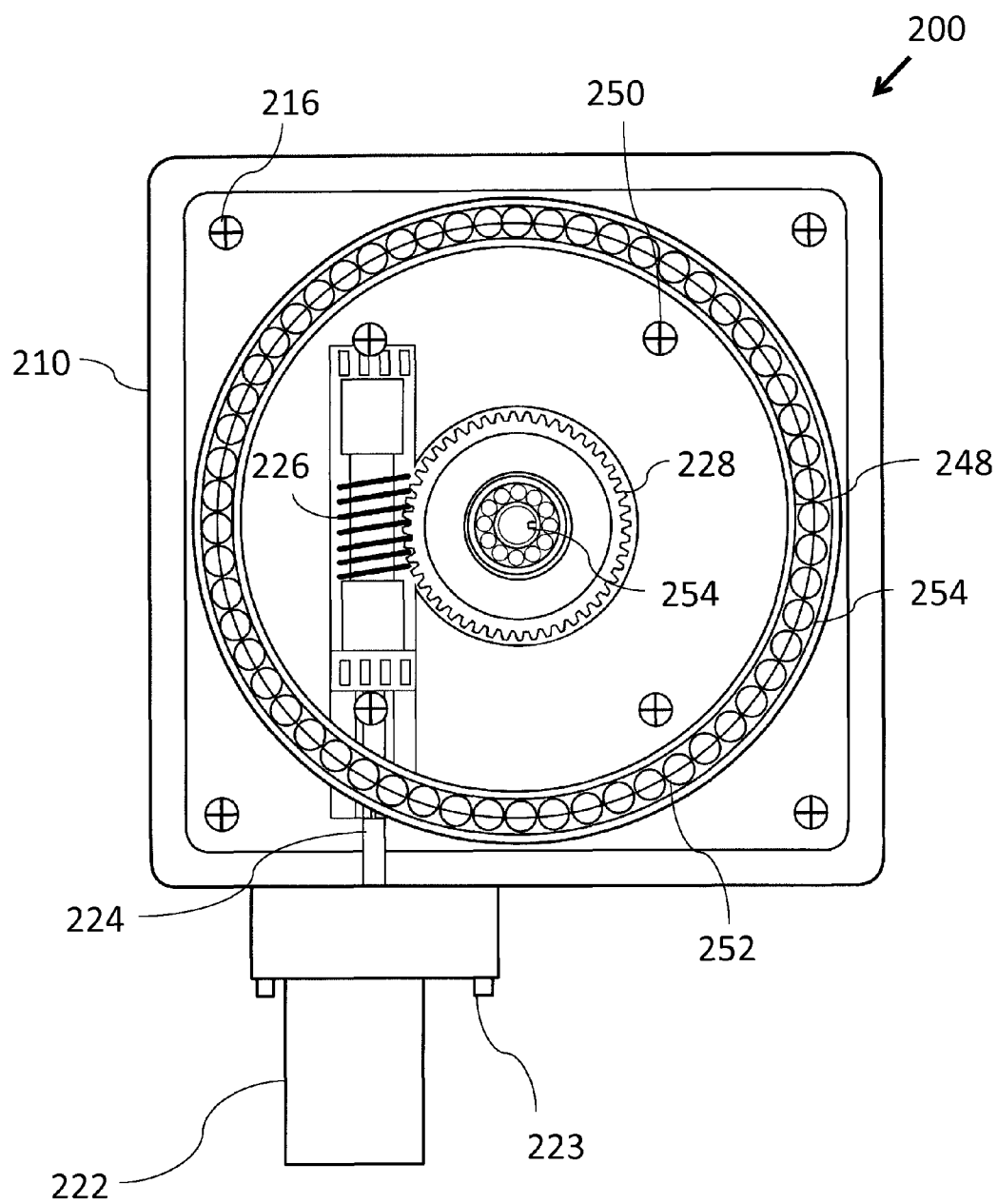
FIG. 13 shows a top view of a third embodiment with base 210 partially removed.
Figure 14:
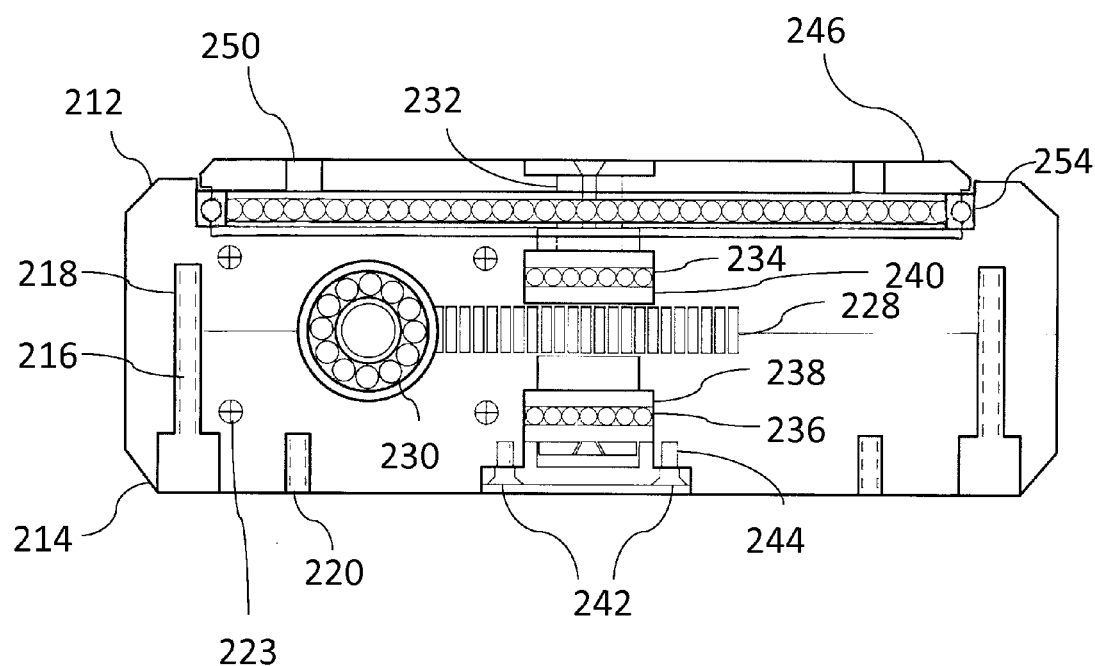
FIG. 14 shows a side view of the third embodiment of FIG. 13, with base 210 partially removed.

Another motorized embodiment is shown in FIGS. 13 and 14. The mount 200 includes a base 210 that consists of two horizontal portions 212, 214 held together by case bolts 216 where the bolts holes at 218 include female threads to receive the bolts 216. Allowing access in this way to the middle of the base 210 allows access to the parts therein and thereby permits the remainder of base to be comprised of solid metal wherever generally possible, thereby adding to the stability of the embodiment.

Bolt holes 220 at the bottom of the base 210 are threaded to allow the base to attach to, for example, a bumper with bolts.

Motor 222 is affixed to base 210 by bolts 223 and is coupled to a worm gear shaft 224 which is part of a worm gear 226, which is turn meshes with toothed wheel 228. Worm gear 226 and worm gear shaft 224 are stabilized by a bearing arrangement at 230. Motor 222 may include, for example, a gear reduction system in order to increase the torque potential of the device. Motor 222 may also include an internal locking mechanism to stabilize all moving parts when required.

Toothed wheel 228 is affixed in a relative fixed position to main shaft 232 by means that are obvious to those skilled in the art, for example, a key arrangement, welding, or being manufactured as a single piece. To add stability, shaft 232 includes two race and bearing arrangements, 234 and 236, wherein the arrangements are encased within recesses 238, 240 in the solid metal of the base 210. The shaft arrangement may be held in place by bolts 242 tightened into threaded recesses 244.

Pivot plate 246 resides partially inside base 210 and rests upon inner race 248, to which it is attached with bolts 250. Pivot bearing set 252 rests between inner race 248 and outer race 254. Pivot plate 246 is affixed in a relative fixed position to main shaft 232 by, for example, a key 254.

Figure 15:
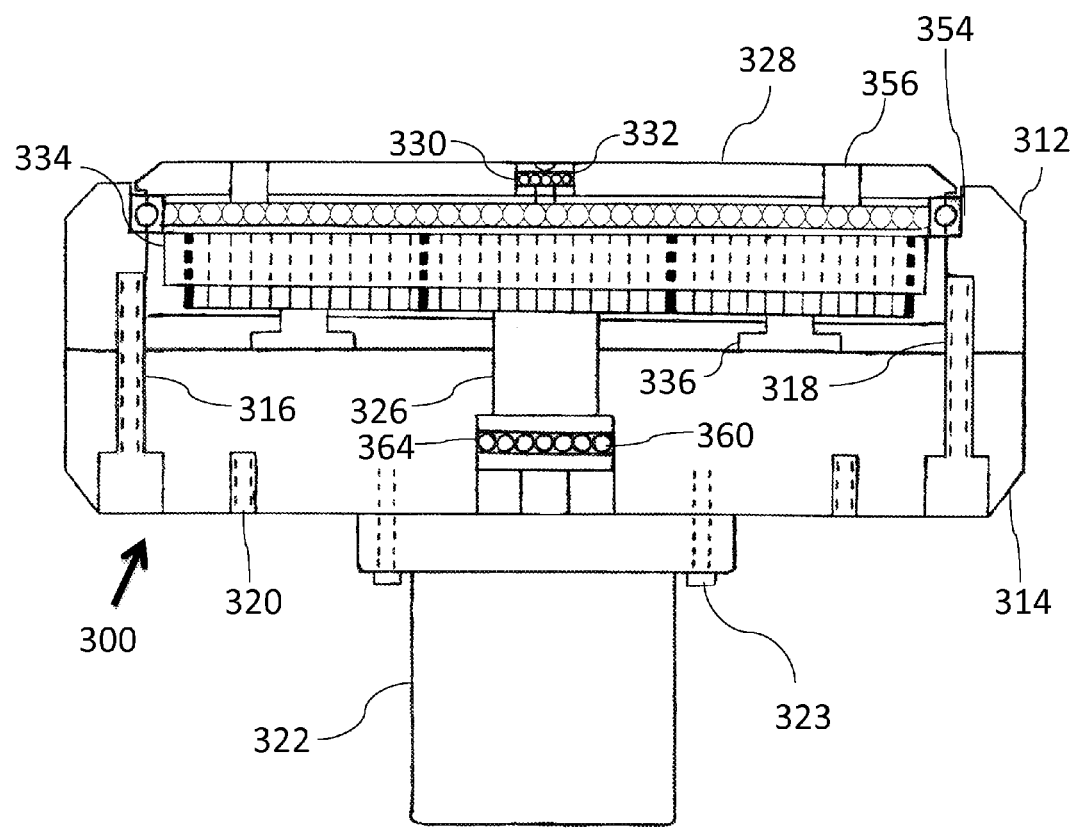
FIG. 15 shows a side view of a fourth embodiment with base 310 partially removed.
Figure 16:
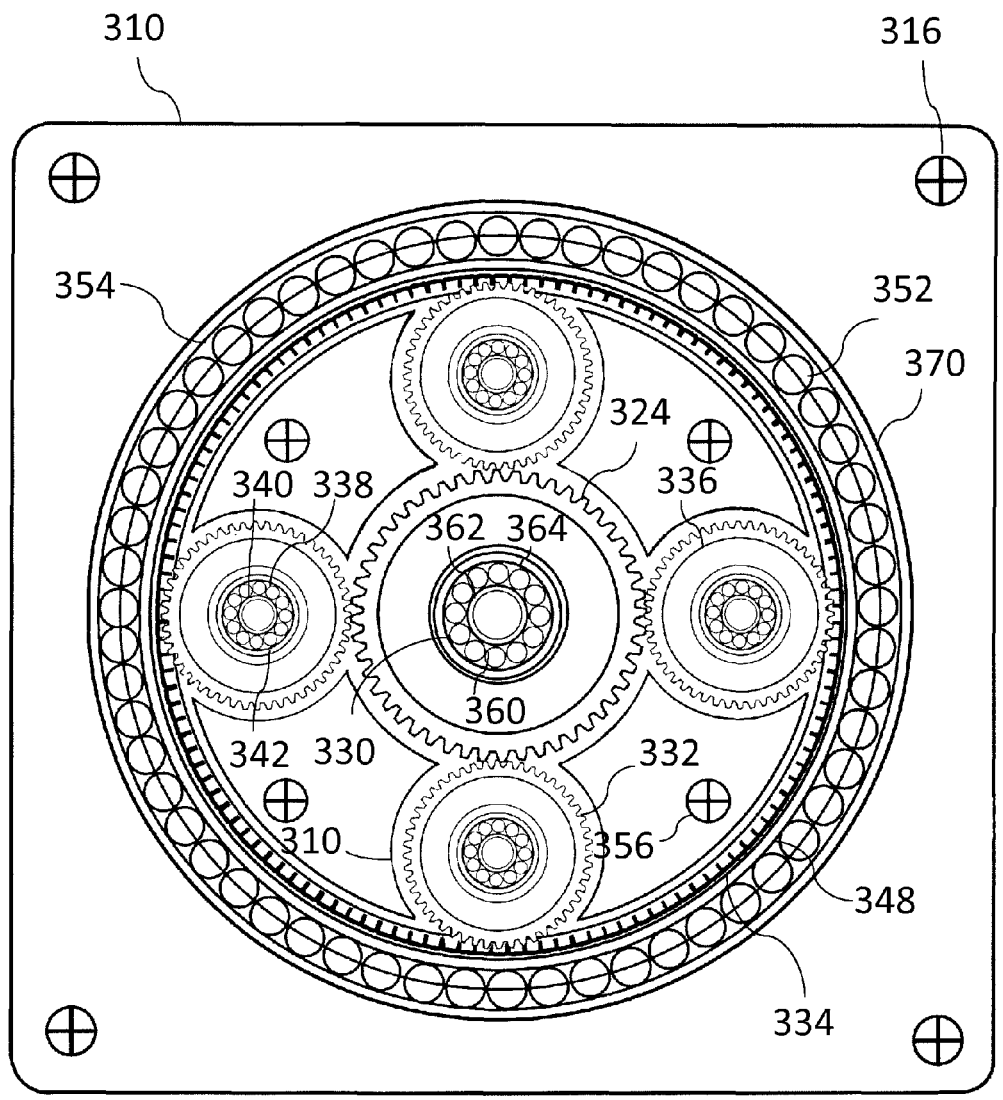
FIG. 16 shows a top of view of the fourth embodiment with base 310 partially removed.
Figure 17:
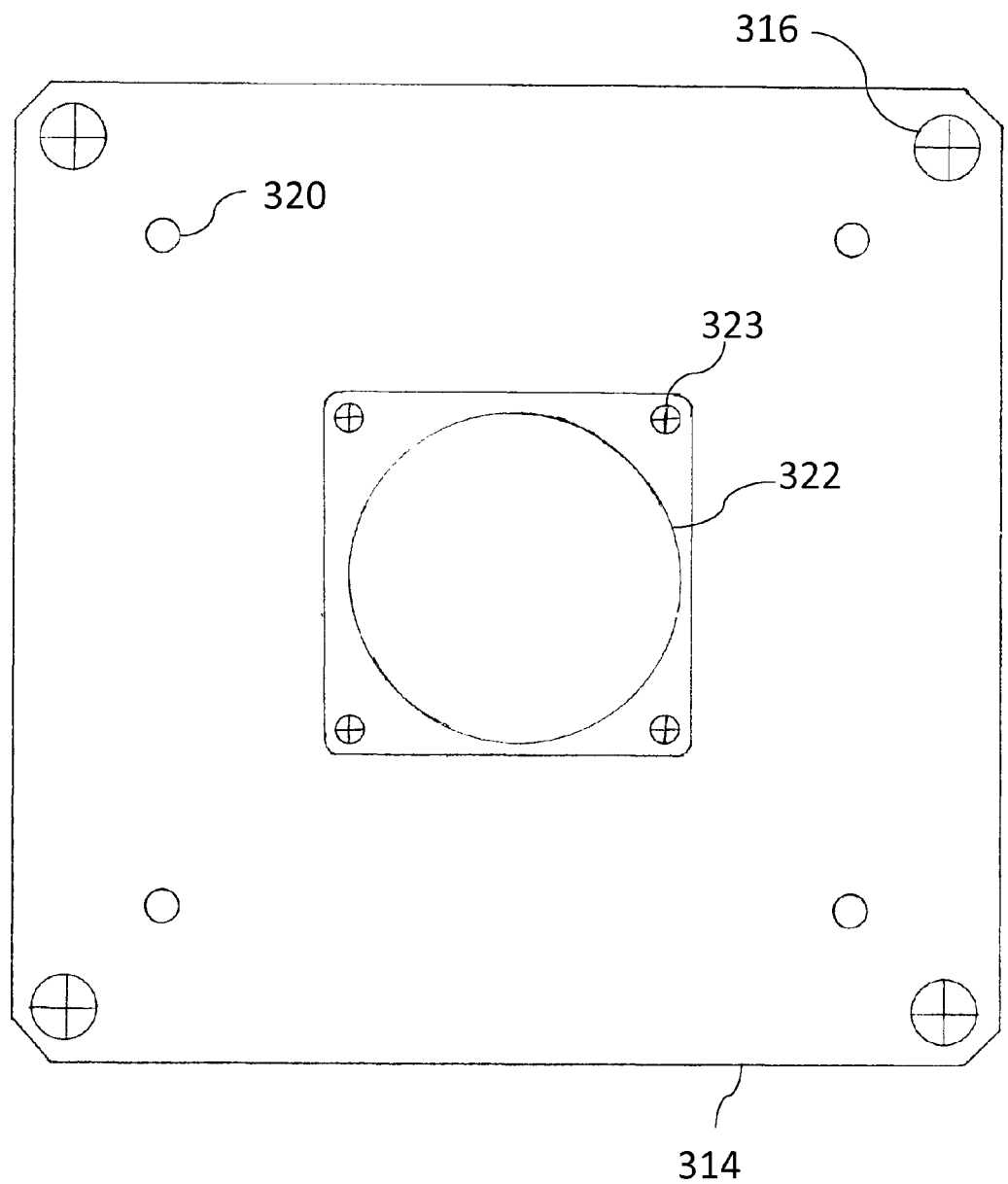
FIG. 17 shows a bottom view of the embodiment of FIG. 15.

Another motorized embodiment is shown in FIGS. 15, 16, and 17, with principles somewhat similar to the embodiment in FIGS. 13 and 14 but using a planetary gear system. Similar to the prior embodiment, the mount 300 includes a base 310 that consists of two horizontal portions 312, 314 held together by case bolts 316 where the bolts holes at 318 include female threads to receive the bolts 316. Allowing access in this way to the middle of the base 310 allows access to the parts therein and thereby permits the remainder of base to be comprised of solid metal wherever generally possible, thereby adding to the stability of the embodiment.

Bolt holes 320 at the bottom of the base 310 are threaded to allow the base to attach to, for example, a bumper with bolts.

Motor 322 is affixed to base 310 by bolts 323. Motor 322 may include, for example, a gear reduction system in order to increase the torque potential of the device.

In this embodiment, sun gear 324 is affixed to main shaft 326 by means obvious to those skilled in the art, for example, a key system or welding. However, main shaft 326 is not affixed to pivot plate 328 but instead includes a bearing set 330 with a race 332 in the center of the pivot plate 328, thereby allowing shaft 326 and pivot plate 328 to rotate at different speeds. Pivot plate resides partially in recess 270.

Sun gear 324 meshes with four planet gears 332 which in turn each mesh with the same outer ring gear 334, which is affixed to, or manufactured as a part of, inner race 348 and pivot plate 328. Note in this embodiment pivot plate 328 is affixed to inner race 348 with bolts 356. Each planet gear 332 is supported by a stand 336 that includes a bearing set 338 with an inner and outer race 340, 342. Sun gear 324 and planet gears 332 are all surrounded by the solid metal base 310. Pivot bearing set 352 rests between inner race 348 and outer race 354.

To add stability, main shaft includes a bearing set 360 with an inner and outer race 362, 364.

Modifications to the invention and embodiments described above are numerous and while the modifications may be novel and nonobvious, the means of their implementation will be obvious to those skilled in the art. By way of example only, the winch may include a fairlead 16 with trigger switches on each fairlead side 18 that will cause the winch position to self-correct when the cable 82 pushes against one of the trigger switches. The trigger switches would be electrically coupled to the worm gear motor such that the worm gear motor will activate in a certain direction when the cable 82 presses against and activates one of the switches, thereby rotating the winch to a centered position during unspooling or spooling of the cable.

As another modification example, the controller for the worm gear motor and/or the winch may be controlled by a smart phone application, a Bluetooth, or by a coded remote control device.

As another modification example, the worm cylinder 62 may include an externally accessible coupling for an allen key or other turning mechanism, such that worm cylinder 62 (and therefore pivot plate 66) may be turned manually if needed.

As another modification example, the winch mount base 60 can include LED lights that are electrically coupled to the power/signal cord 94, for nighttime visibility and use.

As another modification example, a camera may be attached to the winch 80 such that a user could, for example, view through a smartphone application the progress of the spooling of the cable 82, to determine, for example, whether the cable was at risk of unspooling completely or, for example, whether the cable was spooling properly, thereby allowing a user to keep a safe distance from the winch and taut cable while the winch was in use.

Figure 10:
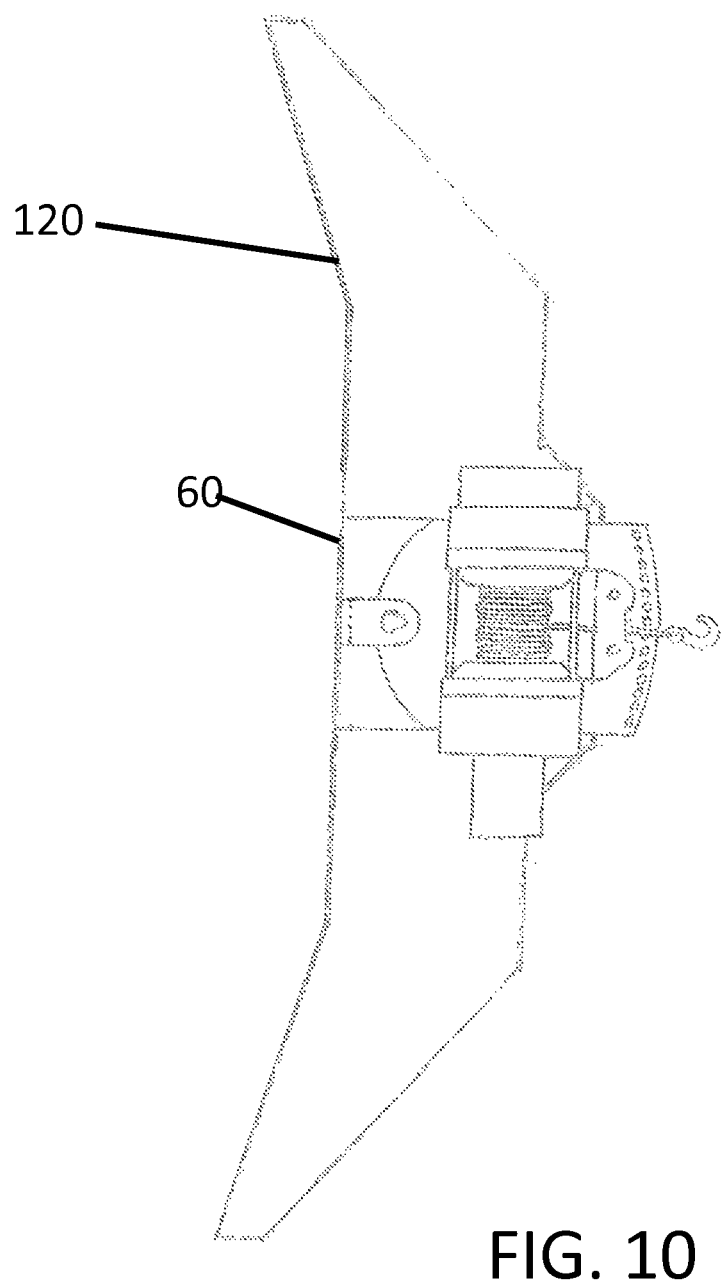
FIG. 10 shows a top view of the embodiment of FIG. 5 with a bumper cover and a winch.
Figure 11:
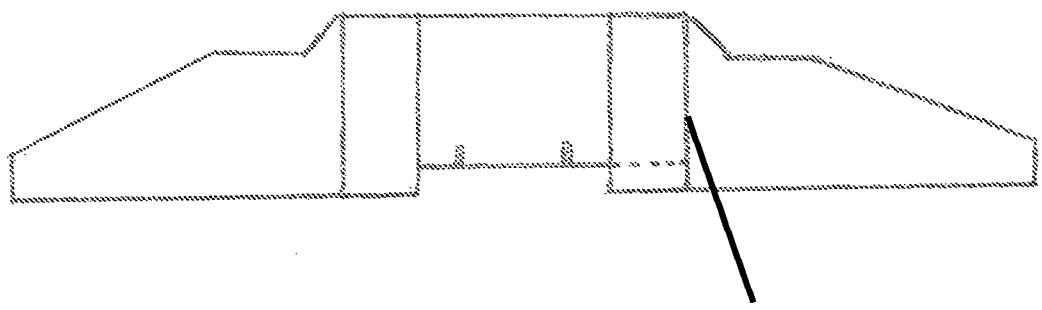
FIG. 11 shows the bumper cover of FIG. 10 without the winch.
Figure 12:
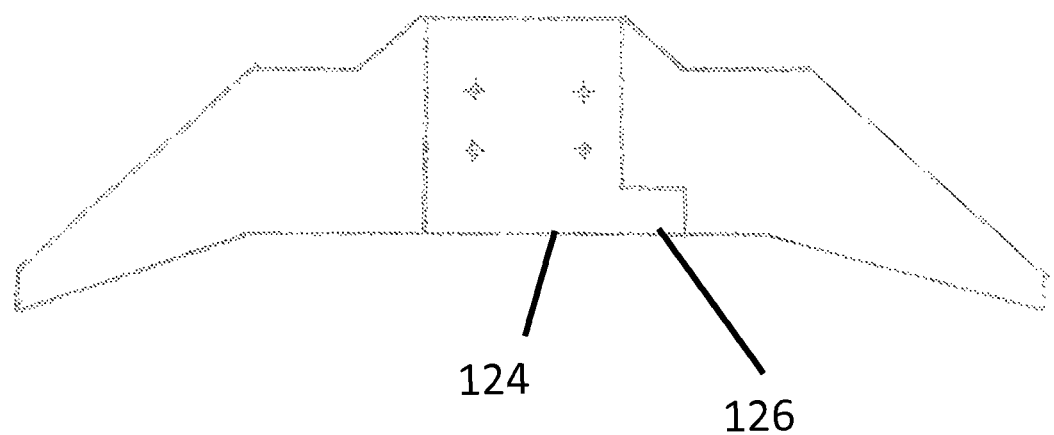
FIG. 12 shows a top cross-section view of the bumper cover of FIG. 10.

As another modification, as shown in FIGS. 10-12, the winch mount base 60 may attach to a larger bumper cover 120 at the bumper mount base 124. Side flap 122 covers worm gear motor casing 70 and any power/signal cord coupler 96 at bumper mount base portion 126.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:
1. A winch mount, comprising:
(A) a base, wherein said base includes a top and a bottom, and wherein said base is substantially comprised of metal, and wherein said top of said base includes a first circular recess, and wherein said bottom of said base includes at least two vertical bolt holes;
(B) a disc-shaped pivot plate, wherein said pivot plate includes at least two vertical bolt holes;
(C) a first toothed wheel;
(D) a vertical shaft;
(E) an electric motor; and
(F) a control;
wherein,
(A) the diameter of said first circular recess is substantially identical to the diameter of said pivot plate;
(B) said first recess, said pivot plate, and said first toothed wheel are parallel to one another;
(C) said pivot plate is at least partially within said first recess;
(D) said shaft is coupled to said first toothed wheel and said pivot plate such that said shaft, said pivot plate, and said first toothed wheel are in fixed positions relative to one another;
(E) said motor is operable to turn said toothed wheel in both a clockwise and counterclockwise direction; and
(F) said motor is managed by said control such that said control is operable to manage power and current direction of said electric motor.

2. The winch mount of claim 1, further comprising:
(A) a first set of bearings;
(B) a first inner race; and
(C) a first outer race;
wherein,
(A) said first inner and outer races are adjacent to, parallel to, and directly beneath said first circular recess;
(B) said first set of bearings are located directly between said first inner and outer races; and
(C) said pivot plate and said first inner race are in fixed positions relative to one another.

3. The winch mount of claim 2, wherein the at least two vertical bolt holes of said pivot plate are four vertical bolt holes.

4. The winch mount of claim 2, further comprising:
(A) a second set of bearings;
(B) a second inner race; and
(C) a second outer race;
wherein,
(A) said second inner race is affixed to said shaft;
(B) said second inner and outer races are below said first inner and outer races and inside said base;
(C) the diameter of said second inner race is greater than the diameter of said shaft; and
(D) each bearing in said second set of bearings is between said second inner and outer races.

5. The winch mount of claim 4, further comprising:
(A) a third set of bearings;
(B) a third inner race; and
(C) a third outer race;
wherein,
(A) said third inner race is affixed to said shaft;
(B) said third inner and outer races are below said toothed wheel and inside said base;
(C) the diameter of said third inner race is greater than the diameter of said shaft; and
(D) each bearing in said third set of bearings is between said third inner and outer races.

6. The winch mount of claim 3, wherein said inner recess includes four vertical bolt holes that are superpositioned with the four vertical bolt holes of the pivot plate.

7. The winch mount of claim 1, wherein said control is an application on a mobile phone.

8. The winch mount of claim 1, wherein a worm gear is coupled to said electric motor, and wherein said worm gear is positioned adjacent to and meshed with said toothed wheel such that said worm gear is operable to turn said first toothed wheel.

9. The winch mount of claim 1, wherein said shaft is directly affixed to said pivot plate.

10. The winch mount of claim 1, wherein said control includes a Bluetooth.

11. A winch mount, comprising:
(A) a base, wherein said base includes a top and a bottom, and wherein said top of said base includes a first circular recess;
(B) a disc-shaped pivot plate, wherein said pivot plate includes at least two vertical bolt holes;
(C) a meshed set of planetary gears, comprising a sun gear, at least two planet gears, and a ring gear;
(D) a vertical shaft;
(E) a set of bearings;
(F) an electric motor; and
(G) a control;
wherein,
(A) the surface diameter of said first circular recess is substantially identical to the diameter of said pivot plate;
(B) said first recess, said pivot plate, and each gear in said set of planetary gears are co-planar to one another;
(C) said pivot plate is partially within said first recess;
(D) said shaft is coupled to said sun gear such that said shaft and said sun gear are in fixed positions relative to one another;
(E) said ring gear is coupled to said pivot plate such that said ring gear and said pivot plate are in fixed positions relative to one another;
(F) said motor is operable to turn said shaft in both a clockwise and counterclockwise direction; and
(G) said motor is managed by said control such that said control is operable to manage power and current direction of said electric motor.

12. The winch mount of claim 11, wherein said base is substantially solid and consists substantially of metal.

13. The winch mount of claim 12, wherein said bottom of said base includes at least two threaded vertical bolt recesses.

14. The winch mount of claim 11, wherein said at least two planet gears are four planet gears.

15. The winch mount of claim 11, further comprising:
(A) a first set of bearings;
(B) an inner race; and
(C) an outer race;
wherein,
(A) said inner race is between, affixed to, and parallel to said pivot plate and said ring gear;
(B) each bearing in said first set of bearings is between said first inner and outer races.

16. The winch mount of claim 15, further comprising:
(A) a second set of bearings;
(B) a second inner race; and
(C) a second outer race;
wherein,
(A) said second inner race is affixed to said shaft;

(B) said second inner and outer races are below said first inner and outer races and inside said base;
(C) the diameter of said second inner race is greater than the diameter of said shaft; and
(D) each bearing in said second set of bearings is between said second inner and outer races.

17. The winch mount of claim 11, wherein said base consists of two horizontal portions held together by bolts.

\* \* \* \* \*